US009214721B2

(12) United States Patent
Israel et al.

(10) Patent No.: US 9,214,721 B2
(45) Date of Patent: Dec. 15, 2015

(54) ANTENNA DESIGNS AND SYSTEM FOR REDUCING ENERGY EMISSIONS FROM WEARABLE MOBILE DEVICE

(71) Applicant: GPS Tracking and Security IP, LLC, Henderson, NV (US)

(72) Inventors: David Israel, Emek Hayarden (IL); Refael Israel, Rison Ltzion (IL)

( * ) Notice: Subject to any disclaimer, the term of this patent is extended or adjusted under 35 U.S.C. 154(b) by 423 days.

(21) Appl. No.: 13/711,539

(22) Filed: Dec. 11, 2012

(65) Prior Publication Data

US 2014/0159969 A1 Jun. 12, 2014

(51) Int. Cl.
*H01Q 1/38* (2006.01)
*H01Q 1/27* (2006.01)
*H01Q 13/10* (2006.01)

(52) U.S. Cl.
CPC ................. *H01Q 1/273* (2013.01); *H01Q 1/38* (2013.01); *H01Q 13/106* (2013.01); *Y02B 60/50* (2013.01)

(58) Field of Classification Search
CPC ....... H01Q 1/38; H01Q 1/273; H01Q 13/106; Y02B 60/50
See application file for complete search history.

(56) References Cited

U.S. PATENT DOCUMENTS

| | | | | |
|---|---|---|---|---|
| 6,853,341 | B1 * | 2/2005 | Hellgren et al. | 343/742 |
| 7,218,280 | B2 * | 5/2007 | Annamaa | H01Q 1/38<br>343/700 MS |
| 7,408,512 | B1 * | 8/2008 | Rodenbeck | H01Q 1/2208<br>343/700 MS |
| 8,022,879 | B2 * | 9/2011 | Ikeyama | 343/700 MS |
| 8,058,714 | B2 * | 11/2011 | Noll et al. | 257/678 |
| 2003/0103010 | A1 * | 6/2003 | Boyle | H01Q 1/243<br>343/702 |
| 2007/0152887 | A1 * | 7/2007 | Castany et al. | 343/702 |
| 2011/0012788 | A1 * | 1/2011 | Rowell et al. | 343/700 MS |
| 2012/0032837 | A1 * | 2/2012 | Poprawa et al. | 342/189 |

* cited by examiner

*Primary Examiner* — Trinh Dinh
(74) *Attorney, Agent, or Firm* — Kunzler Law Group

(57) ABSTRACT

The present invention relates to design of antennas for efficient communication over the radio-frequency airwaves in applications such as cellular phones and more particularly, wearable wireless devices, and to a system for reducing the overall electromagnetic energy radiated from a cellular phone designed to be worn on the body. The invention includes a series of antenna designs with a configuration of materials that can transmit wireless signals efficiently without excess power being emitted, enabling regulatory approval of a wearable wireless communications device, enhancing consumer safety, and increasing battery life. The design further enables a single antenna, with extraordinarily small physical dimensions, to be used across many of the most popular wireless communication spectra in the United State and worldwide. The accompanying system further reduces the electromagnetic emissions from a cellular or mobile communications device designed to be worn on the body, further enabling such devices to meet relevant regulatory approval standards in the United States and elsewhere.

24 Claims, 8 Drawing Sheets

21

ANTENNA DESIGNS AND SYSTEM FOR REDUCING ENERGY EMISSIONS FROM WEARABLE MOBILE DEVICE

BACKGROUND

This invention relates generally to efficient antenna designs for mobile communications devices, and systems to reduce the electromagnetic radiation emitted by wearable mobile devices.

Mobile electronic devices are increasingly popular, and demand for wearable wireless devices, including personal location devices, trackers, and mobile personal emergency response systems is expected to grow in the coming years. Smartphones and typical handheld mobile devices do not meet all of the current demand for wireless tracking and similar applications.

For these devices to achieve maximum acceptance, they must be small enough and efficient enough to be packaged in a small form factor with excellent battery life and wireless communications capabilities. For example, these devices, for many applications, must use long-range wireless communications to communicate with wireless base stations, often using the cellular networks at frequencies such as 850 MHz, 900 MHz, 1800 MHz, and 1900 MHz. Such devices may also use short-range wireless communications links, including Wi-Fi™ (IEEE 802.11) band at 2.4 GHz and the Bluetooth™ band at 2.4 GHz, as well as proprietary technologies like Zigbee, ZWave, and ANT+. Communications are also possible in data service bands such as the 3G data communications band at 2170 MHz band (commonly referred to as UMTS or Universal Mobile Telecommunications System band).

To satisfy consumer demand for small form factor wireless communications devices, manufacturers are continually striving to reduce the size of components that are used in these devices. For example, manufacturers have made attempts to miniaturize the antennas used in handheld electronic devices.

A typical antenna may be fabricated by patterning a metal layer on a circuit board substrate or may be formed from a sheet of thin metal using a foil stamping process. Antennas such as planar inverted-F antennas (PIFAs) and antennas based on L-shaped resonating elements can be fabricated in this way. Antennas such as PIFA antennas and antennas with L-shaped resonating elements can be used in handheld devices.

In order to meet government-imposed requirements for wearable wireless devices, antennas must be both small and extremely efficient, requiring less power (and resulting electromagnetic radiation) to send wireless signals.

It would therefore be desirable to be able to provide improved antenna structures for wearable wireless electronic devices, as well as systems designed to reduce the emissions of electromagnetic radiation from said devices.

SUMMARY

A portable electronic device such as a handheld electronic device is provided with wireless communications circuitry that includes one or more antenna.

In the present invention, a wireless antenna is disclosed made from a flexible substrate (such as mylar) commonly used in flexible printed circuit board design, together with a conductive layer, with the resonating elements being formed using negative traces in the conductive material. The antennas disclosed are suitable to operate in the primary cellular radio-frequency bands in the United States, from approximately 800 MHz through approximately 2 gHz, without the need for different antennas for different frequencies, thereby saving substantial space in a wearable device.

Furthermore, the use of a flexible PCB substrate, together with the unique method of connection disclosed in claims 17-24, permits the maker of a wearable wireless device to mount the antennas disclosed on any planar or curvilinear surface using an adhesive, as described in claims 9-16, thus saving further space within the device.

The efficiency of the disclosed antennas is also exceptional when compared with the performance of other cellular antennas, so that wearable devices using the antennas disclosed can produce sufficient signal strength without excessive electromagnetic radiation, enabling devices using the disclosed antenna designs to pass government-required tests of electromagnetic emissions, such as the Specific Absorption Rate ("SAR") testing required by the Federal Communications Commission for wearable wireless devices. The higher efficiency also enables the longer battery life required by wearable wireless devices such as personal tracker and emergency response devices.

Further features of the invention, its nature and various advantages will be more apparent from the accompanying drawings and the following detailed description of the preferred embodiments.

Many similar designs for cellular antennas within the scope of the present invention will occur to one skilled in the art, based on the designs disclosed herein. Because the performance of any antenna is difficult to predict in advance, experimentation with similar designs using similar materials should increase materially the efficiency of the disclosed antennas.

The embodiments will further enhance the ability of one skilled in the art to create wearable wireless devices capable of operating at electromagnetic radiation levels sufficiently low to meet government requirements.

BRIEF DESCRIPTION OF THE DRAWINGS

The invention will be more fully understood by reference to the following detailed description, considered together with the accompanying drawings in which.

DETAILED DESCRIPTION OF THE INVENTION

The following detailed description provides exemplary devices, systems, and methods of the present invention, with specific reference to embodiments depicted in the attached drawings. The present invention is not limited to those embodiments described herein. One skilled in the art will appreciate that other embodiments are within the scope of the invention, as are variations and modifications to the embodiments described herein.

Figure 1:
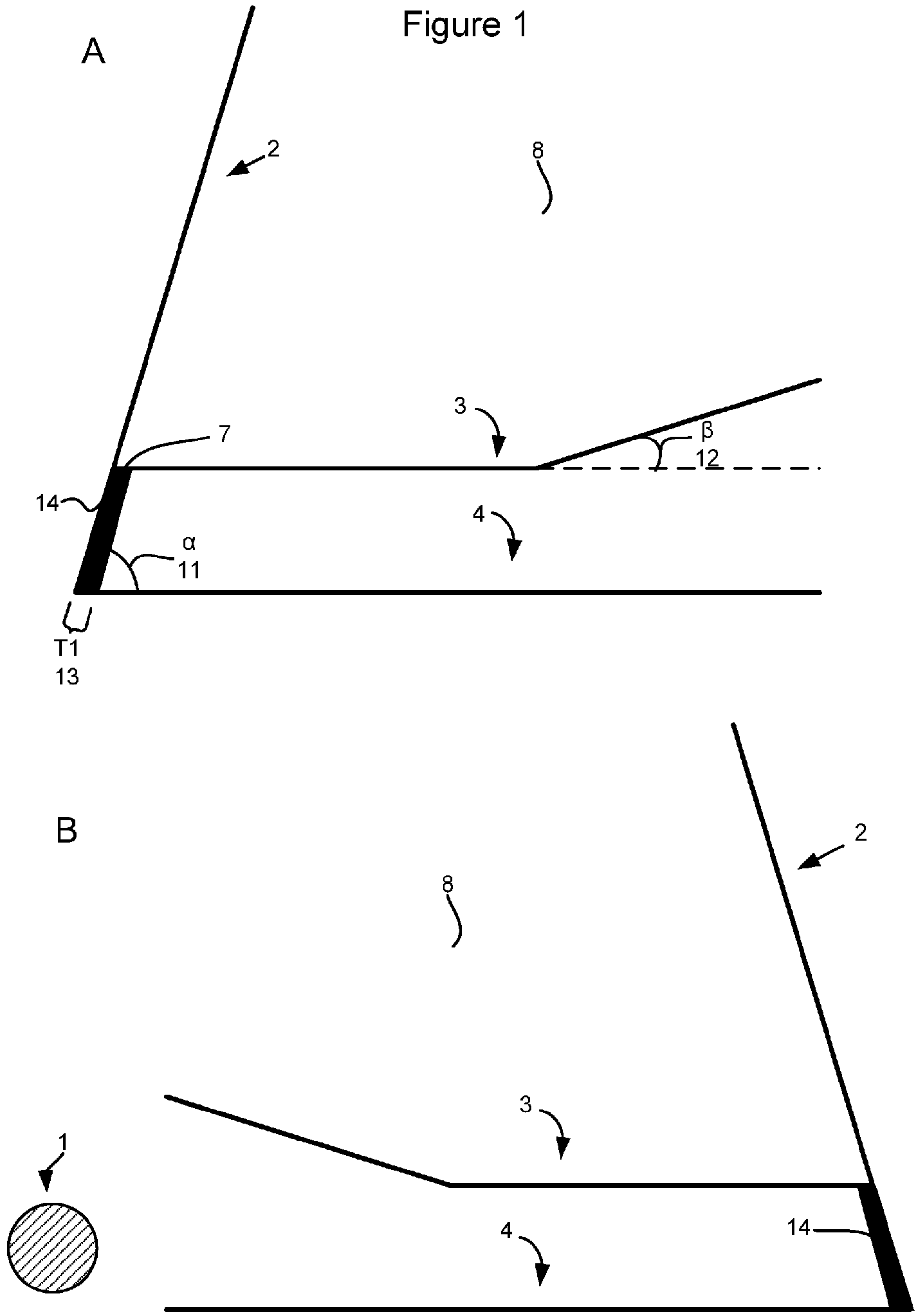
FIG. 1, is a view of the arms of an antenna, according to one embodiment of the antenna of claim 2. Part A shows the embodiment as seen from the conductive side, Part B shows the embodiment as seen from the substrate side.
Figure 2:
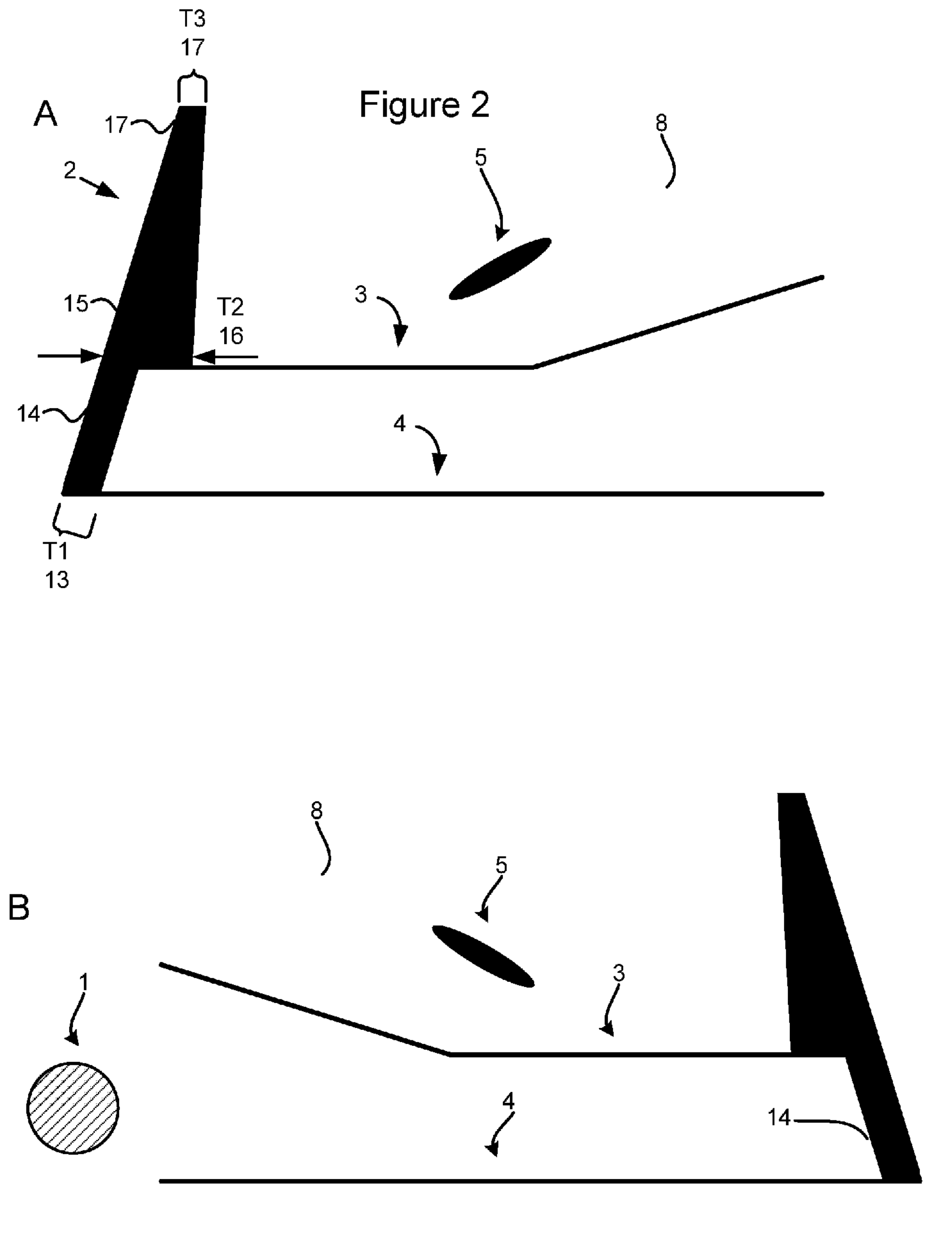
FIG. 2 is a view of the arms of an antenna, according to one embodiment of the antenna of claim 4. Part A shows the embodiment as seen from the conductive side, Part B shows the embodiment as seen from the substrate side.
Figure 3:
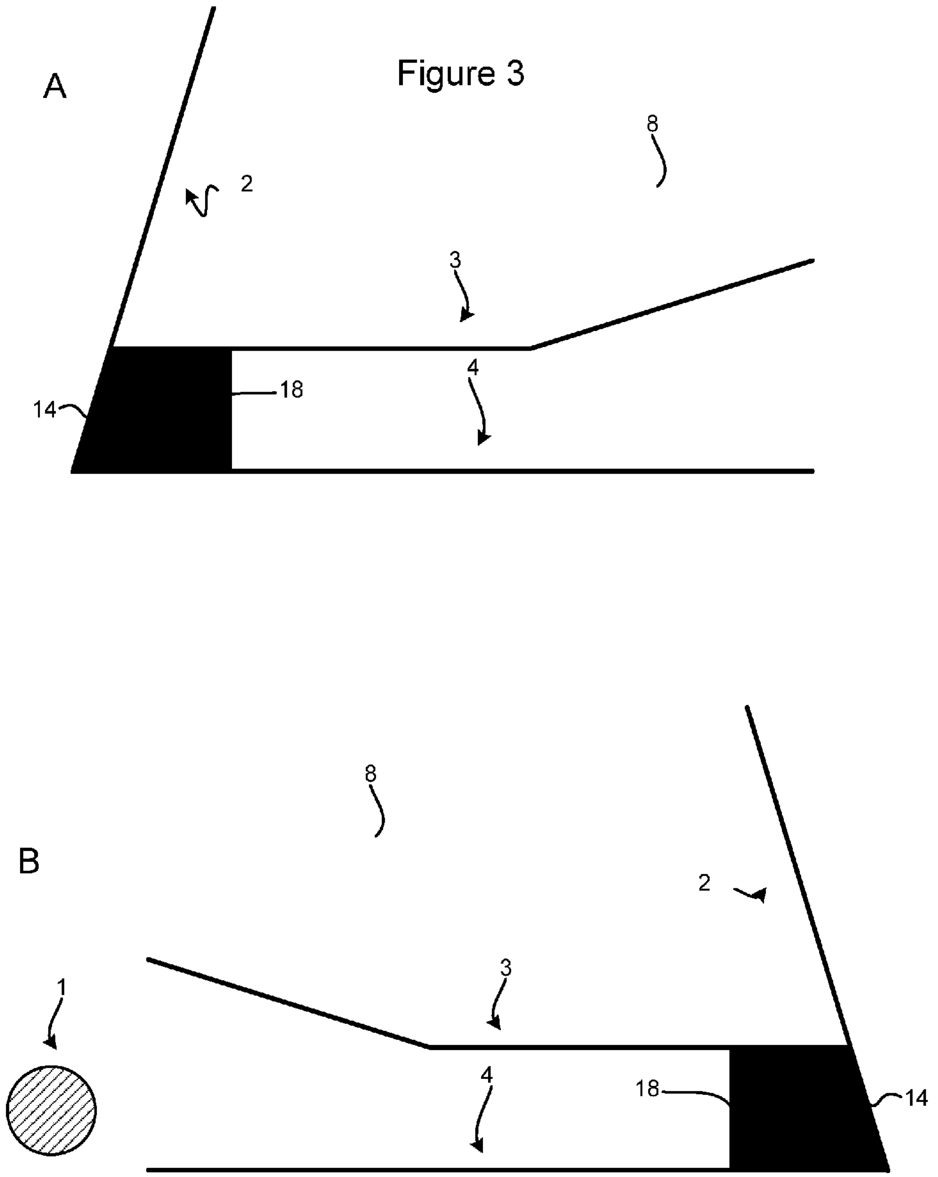
FIG. 3 is a view of the arms of an antenna, according to one embodiment of the antenna of claim 5. Part A shows the embodiment as seen from the conductive side, Part B shows the embodiment as seen from the substrate side.

With reference to FIGS. 1-3, the shaded sections of Part A represent negative traces 2, 3, 4, 7 in the conductive layer 8 of the flexible printed circuit material used to create the antenna. The flexible printed circuit material comprises a flexible substrate layer 7 in physical communication with the flexible conductive layer 8. In the shaded areas there is no flexible conductive layer 8, but only the substrate material of a flexible substrate layer 7—such as, in one embodiment, mylar. In each case, the negative trace vertical antenna arm 2 is shown intersecting with the negative trace first horizontal arm 4, and the negative trace second horizontal arm 3.

The vertical arm 2 is positioned at an angle α 11 of less than 90 degrees but more than 45 degrees relative to the first horizontal arm 4. The second horizontal arm 3 intersects the vertical arm 2. The second horizontal arm 3 runs parallel to the first horizontal arm 4 for a distance until the second arm 3 is angled away from the first horizontal arm 4 at an angle β 12 between 5 degrees and 35 degrees. In one embodiment, a portion 14 of the vertical arm 2 that stretches between the two horizontal arms 3,4 has a thickness T1 13 of more than double but less than four times that of the remaining arms. In an alternative embodiment, a first portion 14 of the vertical arm 2 that stretches between the two horizontal arms 3,4 has a thickness T1 13 of more than double but less than four times that of the horizontal arms, and a second portion 15 of the vertical arm 2 not stretching between the two horizontal arms has a thickness T2 of more than four times that of the horizontal arms 3, 4 at the point 7 where the vertical arm 2 intersects with the second horizontal arm 3 and the second portion of the vertical arm 2 has a thickness T3 17 at termination 17 which is less the thickness of the second portion 15 where the vertical arm 2 intersects with the second horizontal arm 4.

Although the shaded sections are formed by the omission of conductive material, in many embodiments the negative traces 2, 3, 4 are visible through the flexible substrate layer 7, which is often translucent. Accordingly, Part B represents a view of the antenna arms 2-4 from the substrate side. The size and shape of the overall flexible circuit antenna itself, together with the absolute length and thickness of the negative traces 2, 3, 4, 7 may be increased, decreased, or adjusted as needed to meet the technical and space requirements of the mobile device. In an embodiment of the antenna of claim 6, the shaded sections could also represent areas where neither substrate nor conductive material was present.

Figure 4:
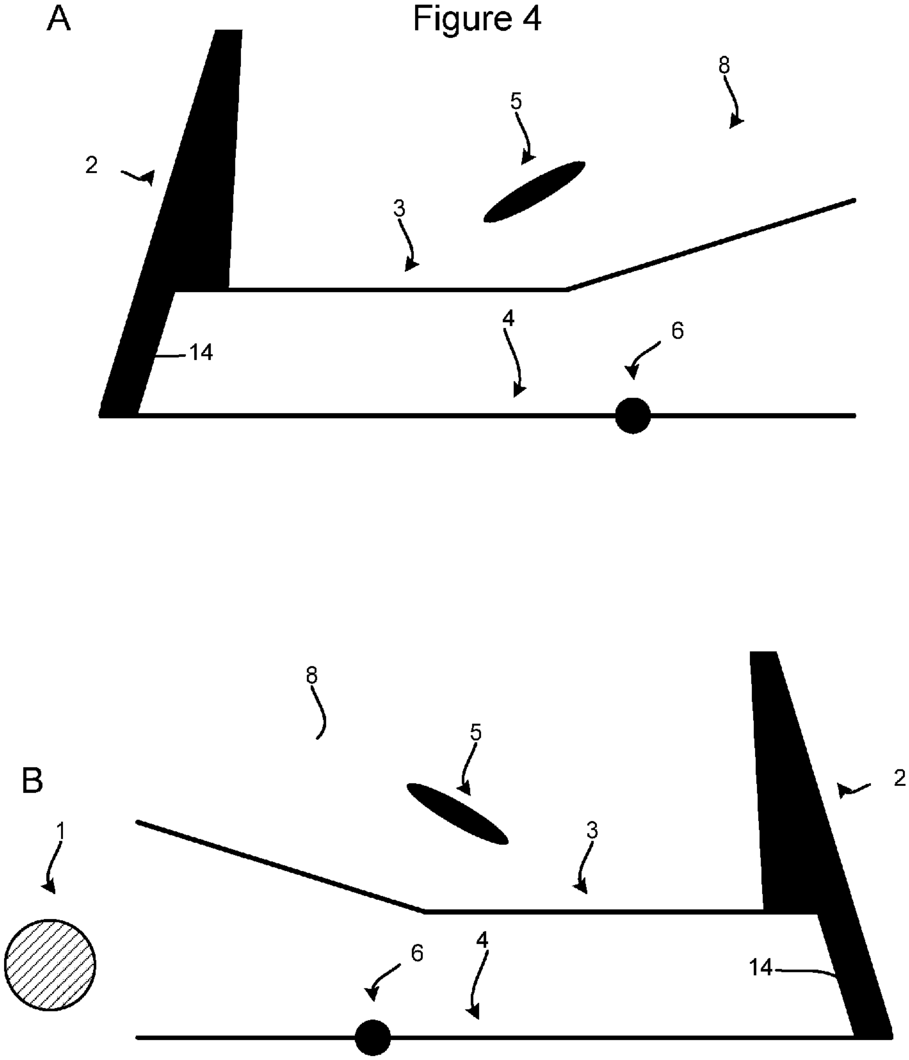
FIG. 4 is a view of the arms of an antenna, according to one embodiment of the antenna of claim 7. Part A shows the embodiment as seen from the conductive side, Part B shows the embodiment as seen from the substrate side.
Figure 5:
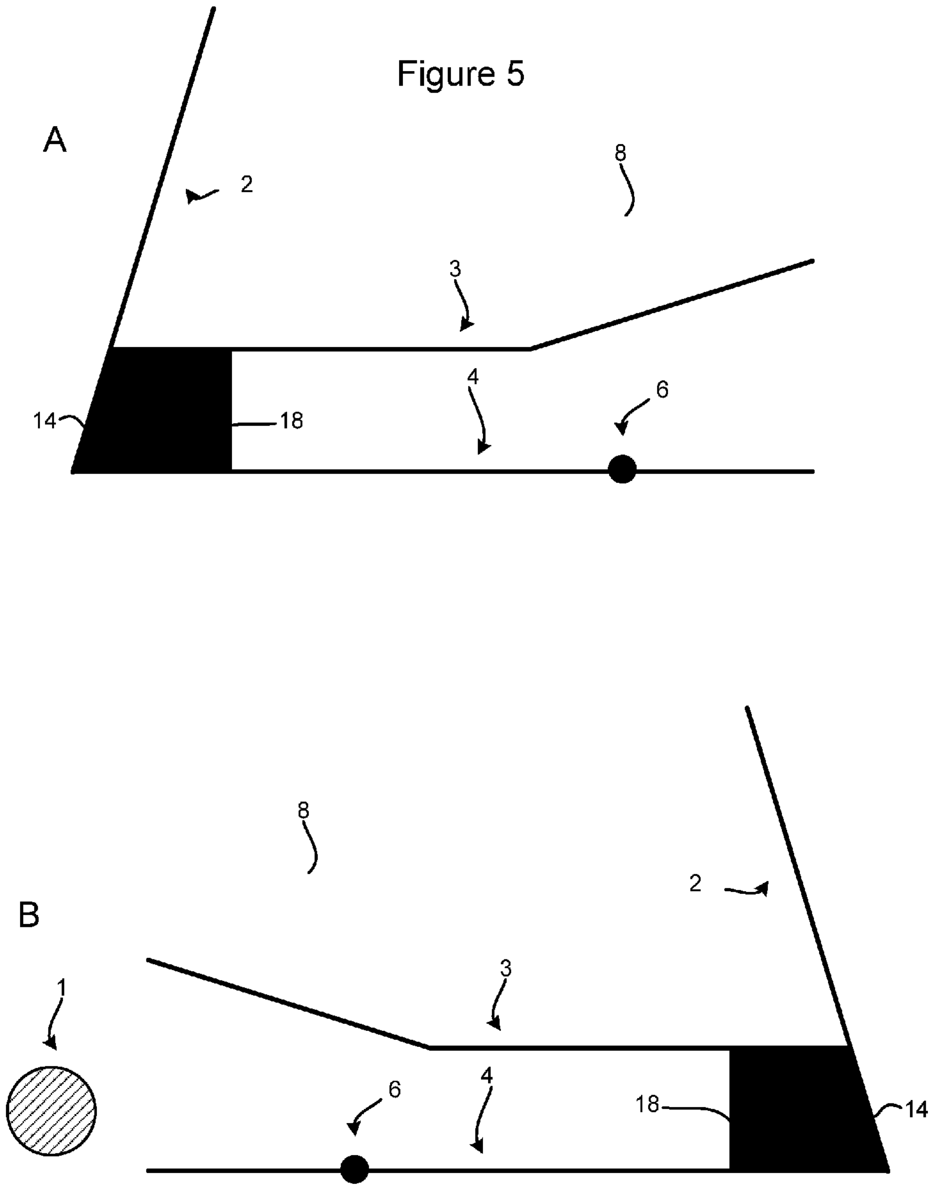
FIG. 5 is a view of the arms of an antenna, according to one embodiment of the antenna of claim 8. Part A shows the embodiment as seen from the conductive side, Part B shows the embodiment as seen from the substrate side.

With reference to FIGS. 4-5, the shaded sections represent negative traces 2, 3, 4 in the conductive layer 8 of the flexible printed circuit material used to create the antenna, so that in the shaded areas there is no flexible conductive layer 8, but only the substrate material of the flexible substrate layer 7—such as, in one embodiment, mylar. In each case, the vertical antenna arm 2 is shown intersecting with the first horizontal arm 4, and the second horizontal arm 3. Although the shaded sections are formed by the omission of conductive material, in many embodiments the negative traces 2, 3, 4, 7 are visible through the flexible substrate layer 7, which is often translucent. The circular section marked "6" in FIGS. 4-5 illustrates the holes placed through one of the negative traces, as disclosed in one embodiment of claim 7 (FIG. 4) and claim 8 (FIG. 5). The size and shape of the overall flexible circuit antenna itself, together with the absolute length and/or thickness of each trace may be increased, decreased, or adjusted as needed to meet the technical and space requirements of the mobile device. In an embodiment of the antenna of claim 6, the shaded sections could also represent areas where neither substrate nor conductive material was present. FIG. 4 shows an additional negative trace 5 that is not intersecting with any of the three previously-described antenna arms 2, 3, 4 is positioned near to the second horizontal arm 3, in the direction opposite the first horizontal arm 4.

The circular area 1 in Part B of each of FIGS. 1-5 represents an embodiment of the conductive disc connection, through which the antenna is connected to the other circuits via physical contact with a push-pin antenna connector 24 or similar simple conductive connector, materially increasing the efficiency of the use of space within a wearable wireless device, as well as the ease and efficiency with which the antennas claimed may be manufactured. FIG. 3 shows an additional quadrangular negative trace 18 may be formed by removing conductive material from, or not applying conductive material to, the area adjacent to the vertical arm and between the two horizontal arms to form a quadrangular negative trace 18, the boundaries of the quadrangular trace 18 being the vertical arm 2 and each of the horizontal arms 3, 4, and a fourth boundary stretching between the two horizontal arms at a desired angle.

Figure 6:
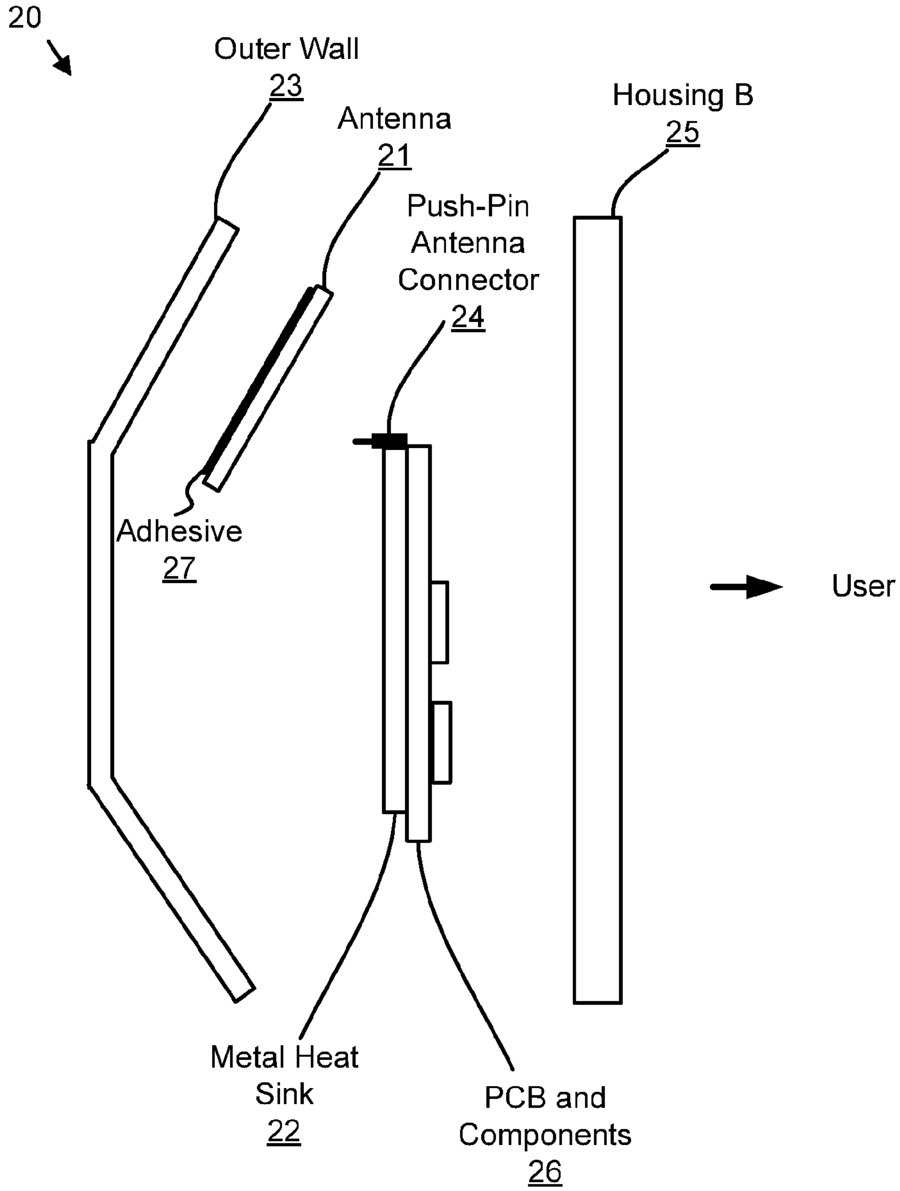
FIG. 6 is an exploded side views of a mobile communications device depicting one embodiment of the radiation reduction system.
Figure 6B:
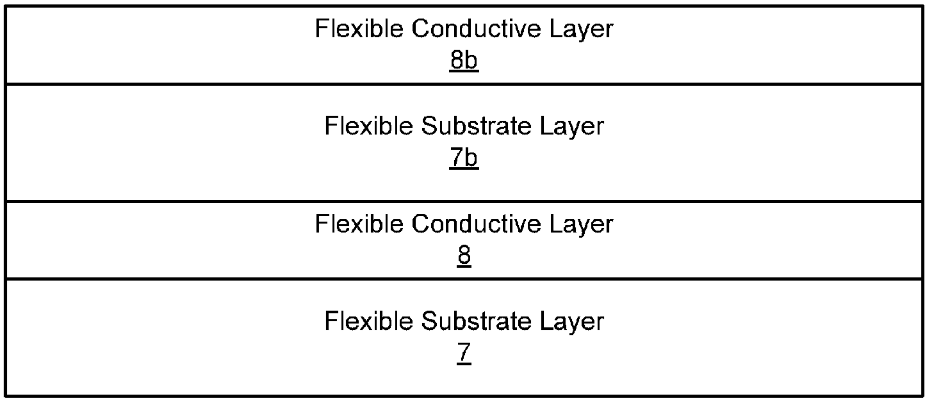
FIG. 6B is a side view antenna cross section.

FIG. 6 depicts one embodiment of the system set forth. An exploded side view of a mobile communications device 20 is shown (in this case, a device styled as a watch). The mobile communications device 20 includes an outer wall 23, the antenna 21, the push-pin antenna connector 24, a housing B 25, a printed circuit board (PCB) and components 26, and a heat sink 22. The antenna 21 is shown affixed to the outer wall of the mobile communications device 20 with the conductive layer of the antenna 21 facing away from side of the device 20 intended to face the user in this embodiment. The metal heat sink 22 is interposed on the opposite side of the antenna 21, nearest the user, so as to perform two separate functions (allowing for the efficient use of space within a small mobile communications device 20). First, the heat sink 22, in this embodiment, transfers heat away from the processing components of the mobile communications device 20. Second, the heat sink 22 interferes with and redirects electromagnetic radiation emissions away from the user. An adhesive 27 is applied to the conductive or substrate layer of the antenna 21, enabling the flexible antenna 21 to adhere to the interior or exterior planar or curvilinear surface such as the outer wall 23 of a product. FIG. 6B shows a cross section of the antenna. The flexible substrate layer 7 and flexible conductive layer 8 are shown. An additional flexible substrate layer 7*b* and a further flexible conductive layer 8*b* of conductive material are shown. The flexible conductive layer 8*b* may be used in combination with the push pin 24 or similar connector to connect the antenna 21 to the radio module or other features of a cellular or wireless communication product.

Figure 7:
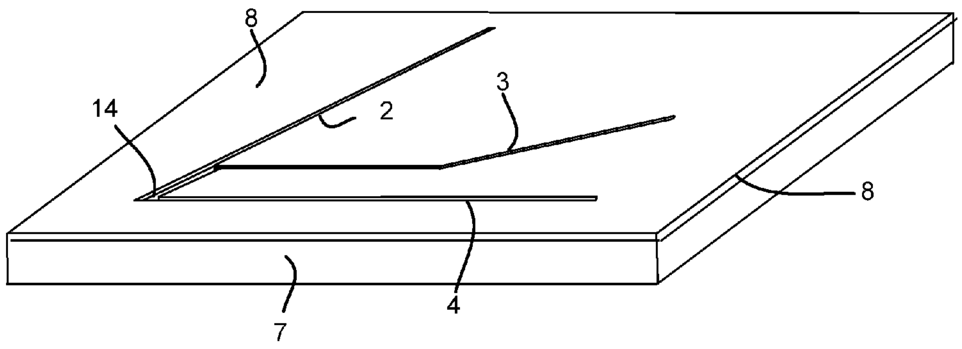
FIG. 7 is a perspective drawing of the arms of an antenna.

FIG. 7 is a perspective drawing of the arms of an antenna. The substrate layer 7, conductive layer 8, negative traces 2, 3, 4 and portion 14 of the vertical arm 2 are shown.

We claim:

1. A radio frequency (RF) antenna, comprising:

a flexible substrate layer or layers made of one of the many materials typically used for flexible printed circuit manufacture;

a flexible conductive layer or layers made of one of the many materials typically used for flexible printed circuit manufacture and in contact with the flexible substrate layer;

a series of negative traces wherein the negative areas are areas where the conductive layer or layers has been removed from or not applied to the substrate layer or layers in the conductive layer or layers, forming antenna arms, arranged in a pattern that includes a first horizontal arm, one end of which first horizontal arm intersects with one end of a vertical arm, so that the vertical arm is positioned at an angle of less than 90 degrees but more than 45 degrees relative to the first horizontal arm, and also includes a second horizontal arm intersecting the vertical arm, the second horizontal arm running parallel to the first horizontal arm for a distance until the second arm is angled away from the first horizontal arm at an angle between 5 degrees and 35 degrees.

2. The antenna of claim 1, where a first portion of the vertical arm that stretches between the two horizontal arms has a thickness of more than double but less than four times that of the remaining arms.

3. The antenna of claim 1, where a first portion of the vertical arm that stretches between the two horizontal arms has a thickness of more than double but less than four times that of the horizontal arms, and a second portion of the vertical arm not stretching between the two horizontal arms has a thickness more than four times that of the horizontal arms at the point where the vertical arm intersects with the second horizontal arm, and the second portion of the vertical arm has a thickness at termination which is less than the thickness of the second portion where the vertical arm intersects with the second horizontal arm.

4. The antenna of claim 3, where an additional negative trace, not intersecting with any of the three previously-described antenna arms, is positioned near to the second horizontal arm, in the direction opposite the first horizontal arm.

5. The antenna of claim 1, where an additional quadrangular negative trace is formed by removing conductive material from, or not applying conductive material to, the area adjacent to the vertical arm and between the two horizontal arms to form a quadrangular negative trace, the boundaries of the quadrangular trace being the vertical arm and each of the horizontal arms, and a fourth boundary stretching between the two horizontal arms at a desired angle.

6. The antenna of claim 1, where both the flexible conductive layer and the flexible substrate layer are removed from the negative traces.

7. The antenna of claim 3, where a small circular hole is punched through both the flexible substrate layer and the flexible conductive layer of a portion of the first horizontal arm.

8. The antenna of claim 5, where a small circular hole is punched through both the flexible substrate layer and the flexible conductive layer of a portion of the first horizontal arm.

9. The antenna of claim 1, where an adhesive is applied to the flexible conductive layer or the flexible substrate layer, enabling the flexible antenna to adhere to the interior or exterior planar or curvilinear surface of a product.

10. The antenna of claim 2, where an adhesive is applied to the flexible conductive layer or the flexible substrate layer, enabling the flexible antenna to adhere to the interior or exterior planar or curvilinear surface of a product.

11. The antenna of claim 3, where an adhesive is applied to the flexible conductive layer or the flexible substrate layer, enabling the flexible antenna to adhere to the interior or exterior planar or curvilinear surface of a product.

12. The antenna of claim 4, where an adhesive is applied to the flexible conductive layer or the flexible substrate layer, enabling the flexible antenna to adhere to the interior or exterior planar or curvilinear surface of a product.

13. The antenna of claim 5, where an adhesive is applied to the flexible conductive layer or the flexible substrate layer, enabling the flexible antenna to adhere to the interior or exterior planar or curvilinear surface of a product.

14. The antenna of claim 6, where an adhesive is applied to the flexible conductive layer or the flexible substrate layer, enabling the flexible antenna to adhere to the interior or exterior planar or curvilinear surface of a product.

15. The antenna of claim 7, where an adhesive is applied to the flexible conductive or the flexible substrate layer, enabling the flexible antenna to adhere to the interior or exterior planar or curvilinear surface of a product.

16. The antenna of claim 8, where an adhesive is applied to the flexible conductive layer or the flexible substrate layer, enabling the flexible antenna to adhere to the interior or exterior planar or curvilinear surface of a product.

17. The antenna of claim 1 where the antenna includes a further flexible conductive layer of conductive material which can be used in combination with a push pin or similar connector to connect the antenna to the radio module or other features of a cellular or wireless communication product.

18. The antenna of claim 2 where the antenna includes a further flexible conductive layer of conductive material which can be used in combination with a push pin or similar connector to connect the antenna to the radio module or other features of a cellular or wireless communication product.

19. The antenna of claim 3 where the antenna includes a further flexible conductive layer of conductive material which can be used in combination with a push pin or similar connector to connect the antenna to the radio module or other features of a cellular or wireless communication product.

20. The antenna of claim 4 where the antenna includes a further flexible conductive layer of conductive material which can be used in combination with a push pin or similar connector to connect the antenna to the radio module or other features of a cellular or wireless communication product.

21. The antenna of claim 5 where the antenna includes a further flexible conductive layer of conductive material which can be used in combination with a push pin or similar connector to connect the antenna to the radio module or other features of a cellular or wireless communication product.

22. The antenna of claim 6 where the antenna includes a further flexible conductive layer of conductive material which can be used in combination with a push pin or similar connector to connect the antenna to the radio module or other features of a cellular or wireless communication product.

23. The antenna of claim 7 where the antenna includes a further flexible conductive layer of conductive material which can be used in combination with a push pin or similar connector to connect the antenna to the radio module or other features of a cellular or wireless communication product.

24. The antenna of claim 8 where the antenna includes a further flexible conductive layer of conductive material which can be used in combination with a push pin or similar connector to connect the antenna to the radio module or other features of a cellular or wireless communication product.

* * * * *